Oct. 6, 1970  P. F. VASTERLING  3,532,784
METHOD FOR FABRICATION OF ABLATIVE COMPONENTS
Filed June 9, 1966  2 Sheets-Sheet 1

INVENTOR.
PAUL F. VASTERLING
BY
ATTORNEYS

Oct. 6, 1970 — P. F. VASTERLING — 3,532,784
METHOD FOR FABRICATION OF ABLATIVE COMPONENTS
Filed June 9, 1966 — 2 Sheets-Sheet 2
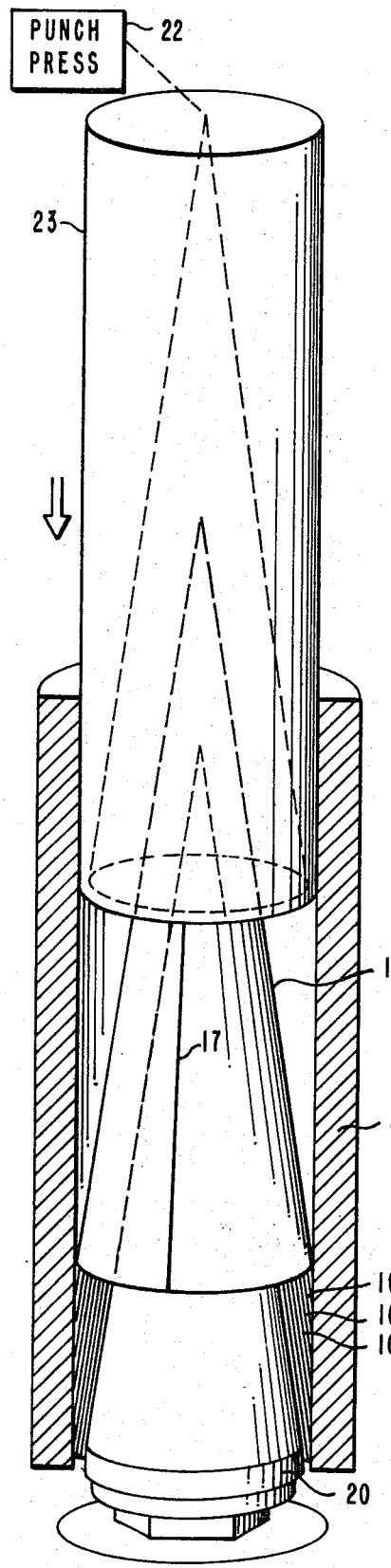
FIG.—4
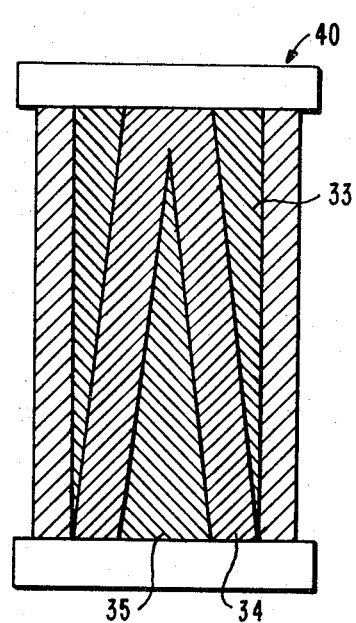
FIG.—7
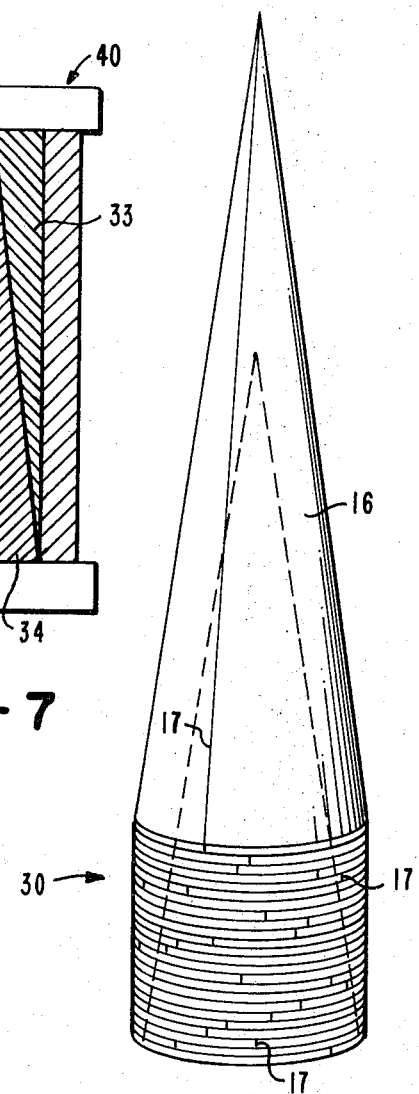
FIG.—5
INVENTOR.
PAUL F. VASTERLING
BY
*Fraser & Bogucki*
ATTORNEYS

United States Patent Office 3,532,784
Patented Oct. 6, 1970

3,532,784
METHOD FOR FABRICATION OF ABLATIVE COMPONENTS
Paul F. Vasterling, Westminster, Calif., assignor to Hitco, a corporation of California
Filed June 9, 1966, Ser. No. 556,482
Int. Cl. B29c 27/24
U.S. Cl. 264—152                                4 Claims

ABSTRACT OF THE DISCLOSURE

A cylindrical ablative part comprising a plurality of layers of ablative material disposed at a small angle relative to the centerline of the part is prepared by debulking a stack of cones of ablative material, segmenting the debulked stack of cones, rearranging the segments in nested relation and finally densifying and unifying the nested segments.

---

This invention relates to techniques for forming high temperature and erosion resistant products, and more particularly to such products as are used for ablative purposes and also to methods for fabricating such products with specific fiber dispositions and orientations.

As the arts of designing and operating rocket engines and other high thrust mechanisms based upon the generation of extremely high temperature gases have progressed, it has become increasingly necessary to refine and improve the component structures that are exposed to the high temperature, high velocity gas environment. A wide variety of materials have been developed, most of which utilize what is known as the ablative principle. Ablative materials generally have high melting points and high heats of fusion, and erode slowly in controlled fashion at high temperatures. Structures made of such materials have extremely high heat capacities and low heat conductivities, so that a relatively low cold side temperature is maintained despite the fact that the exposed surface may be melting or undergoing sublimation.

Although foam, refractory laminate structures and other materials are used for specific applications, the great majority of structures of this character comprise composite bodies having refractory fibers disposed within a high temperature resin matrix. The refractory fibers are typically vitreous silica, asbestos, carbon, graphite and other elemental or oxide materials having needed strength, conductivity and temperature properties. To meet cost and weight requirements for specific applications, a wide variety of structures are available, ranging from compression molded bodies having random fiber orientations to complex structures using a number of parts of different materials in combination with an associated primary structure. Where, as often happens, weight is a primary consideration, superior strengths and optimum ablative characteristics are achieved by controlling the disposition and orientation of the individual fibers relative to the exposed surface. Fabric materials are often used because of the ease of handling the fabric and the strength imparted by the intermeshing of the fibers. The fibers themselves are typically disposed at an angle to the exposed surface, in what is referred to as an "end grain" disposition, so that the fibers melt or vaporize along their length during ablation, giving the structure longer life, and greater freedom from a tendency to delaminate.

Most ablative bodies of this nature are in the form of thick walled bodies of revolution, such as cylindrical nozzles, flared skirt portions or exit cones for nozzle assemblies, nose cones and heat shields. Individual fabric layers are typically disposed at a selected angle relative to the axis of the body of revolution, the angle being chosen for the specific application. Typically, the angle of inclination is in the range of from 10° to approximately 90°, with the edge of the fabric closest to the exposed surface lying downstream relative to the ablating gases. Tape wrapping and hand layup techniques are used for forming these structures, the tape wrapping technique generally comprising winding a tape or band of the fabric material in continuous fashion about a central mandrel.

Considerable difficulties are encountered in fabricating many of these structures because of problems which are at first not apparent. The closer the angle of a fabric layer to the center line of the body and the thicker the part, the more difficult it becomes to avoid internal wrinkling and voids. Either defect generally renders the part unacceptable. While this problem is present to some degree in practically all structures provided by conventional techniques, it is particularly acute when the angle of the fabric layers becomes very small, and the thickness of the part has a high ratio to the internal diameter of the part. The problem arises because after winding the fabric, the resin disposed in the fabric is cured and the entire body is densified, generally by the exertion of uniform pressures inwardly upon the body. Consequently, the wound turns are shortened during the compaction, particularly at the outside, giving rise to tendencies to wrinkle and create voids wherever irregularities exist. Gases generated during curing may become trapped and also create voids.

A similar severe problem arises because of the high cost of the materials necessarily used in these structures. Some wastage is inherent when fabric cuts are made so as to give proper fiber disposition, but under many circumstances the amount of fiber actually included in the part may be only a small proportion of the total amount of material. While some of the excess can sometimes usefully be employed for other applications in which chopped or short length fibers are suitable, nevertheless the cost of the product is substantially increased. Particular problems are presented when it is desired to have the angle as low as 5° or 6°, because at these angles the structural irregularities and rejection rates become excessive if conventional techniques are used. Nevertheless, design considerations often dictate the use of such very low angles.

It is therefore an object of the present invention to provide an improved method of fabricating ablative structures having control of fiber orientation and disposition.

Another object of the present invention is to provide improved methods for fabricating ablative structures having successive layers of material at a relatively low angle to the center line of a body of revolution, but with minimal wastage of material.

A further object of the present invention is to provide improved ablative structures in the form of a thick walled body of revolution having individual layers of fabric of an ablative material disposed at low angles to the axis of the center line of the body.

Another object of the present invention is to provide improved methods of fabricating and assembling ablative structures with minimum wastage of material.

These and other objects are achieved by methods and structures in accordance with the invention utilizing a combination of preforming individual shaped elements, combining these elements into an elongated solid body, segmenting the solid body, redisposing the segments in a nested relation into a second compact solid body, and then uniting the assembly into the final form. At each stage, the processing step is carried forward by conventional equipment and the final product is derived without need for special tooling.

In a specific example of a method in accordance with the invention, a hollow, thick walled cylinder having a small central aperture and an approximate 6° layup angle for individual fabric layers is initiated by forming individual cones of fabric material, the sides of the cones being at 6° angles to the central axis. An elongated body is built up by stacking individual cones or groups of cones successively and initially compressing them in a punch having appropriately configured dies. An elongated unified body is formed with a long conical tip and a long conical hollow interior. The body is then preformed and unified by subjection to high pressure and moderate temperature. The resultant body is then severed along its length into a number of sections, and the tip portions are inserted within the hollow interior portions. Thus a compact body of the desired final length is produced having the required fabric angle. Unification is completed by subjecting the body to a cycle of increasing temperatures and pressures, completing the densification and curing the resin. In the preliminary preforming step a density of approximately 98% or more of the final density is obtained, so that subsequent wrinkling and voids are avoided. This method not only has important advantages from the standpoint of uniformity of manufacture, but also uses a very high proportion of the raw material.

Parts in accordance with the invention have higher density than have heretofore been achieved, in addition to the superior uniformity mentioned above. The abutment lines within individual layers may be circumferentially varied about the parts, so as to avoid the introduction of local irregularities. The combination of initial debulking, segmentation and reshaping into a different form can be used with a variety of parts of different shapes.

A better understanding of the invention may be had by reference to the following description, taken in conjunction with the accompanying drawings, in which:

FIG. 4 is a simplified perspective and broken away view of a punch mechanism, showing the manner in which component parts of the body of FIG. 1 may be individually formed as cones;

FIG. 5 is a perspective view of a complete stack of cones for use in the product of FIG. 1, showing the interior hollow conical portion in phantom for purposes of understanding;

FIG. 7 is a sectional view of a pressurizing mechanism, showing the segmented elements of FIG. 6 in rearranged form for unification and final curing.

Figure 1:
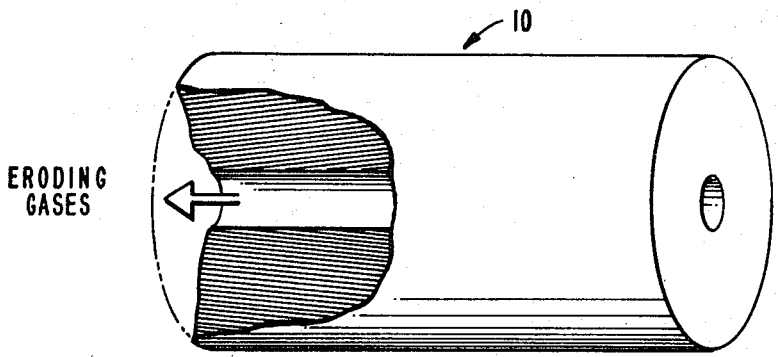
FIG. 1 is a perspective view, partially broken away, of a thick walled hollow cylindrical ablative body, in accordance with the invention, having an approximately 6° layup angle.
Figure 2:
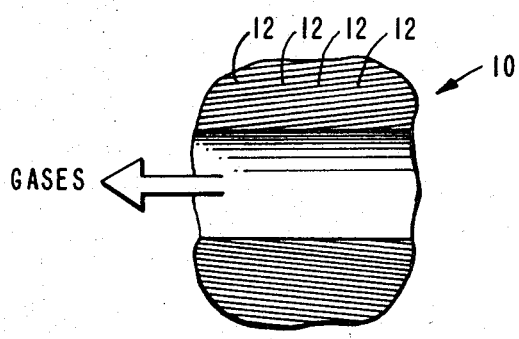
FIG. 2 is an enlarged fragmentary view of the arrangement of FIG. 1, showing the disposition of the layers in detail.

The cylindrical rocket nozzle of FIG. 1 is illustrative of the type of product which may be advantageously fabricated in accordance with the invention. FIG. 1 illustrates a hollow thick walled cylindrical nozzle 10 of ablative material, preferably vitreous silica fabric reinforcing a high temperature resin matrix. The wall thickness is very high in relation to the interior diameter. As better seen in FIG. 2, the individual fabric plies 12 are disposed within the body at a small angle, such as 6° relative to the central axis and the center line of the body. For certain applications this configuration is deemed to approach the optimum, although other angles of inclination and other thicknesses, as well as other materials, may also be used.

The nozzle 10 is a unitary body, but is formed of two or more nested segments in such fashion that the joinder regions between segments do not introduce discontinuities. Essentially, as will become apparent from the description below, the joinder regions have matrix and fiber dispositions like those existing within a segment.

Figure 3:
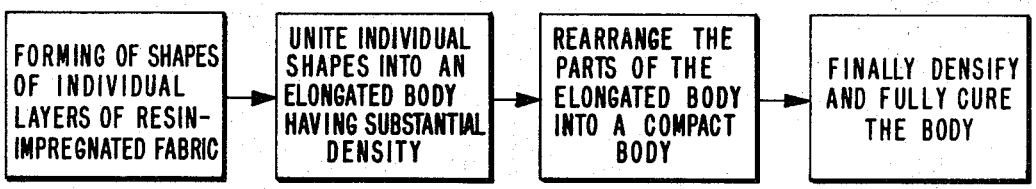
FIG. 3 is a block diagram of successive steps that may be utilized in methods in accordance with the invention.

Methods in accordance with the invention are characterized, as shown in FIG. 3, by segmentation and reorganization of bodies that are initially unlike the desired product. As a first step, given shapes (cones in the present example) of resin-impregnated fabric of a refractory or other high temperature material are formed from single or small numbers of fabric plies. These shapes are then united into an elongated preform body having a high density. By high density is meant in excess of 90% of the desired final density. This elongated body is then segmented and rearranged into a compact configuration, which is then subjected to temperatures and pressures sufficient to finally densify the body and fully cure the resin.

In accordance with specific examples of methods and devices of the invention, a product such as the body of FIG. 1 proceeds from the formation by hand layup or press forming of individual cones 16 of preimpregnated fabric material. The present example is based on the use of A stage phenolic resin-impregnated vitreous silica fabric, and the cones are formed from shaped patterns having an abutment line 17 or seam. Carbon, graphite and other ablative fabrics can also be used with various high temperature resin systems. The fabric may first be cut to a desired pattern, and the hand layup tool may simply be a cone-shaped male die (not shown). For lesser angles and for more readily distorted material, a seamless cone may be formed by stretching the material about the apex.

The cones 16 are then progressively stacked, as shown in FIG. 4 individually or in small groups, with the abutment lines 17 being placed at different angular positions. An initial debulking is undertaken during stacking, by placing the cones 16 on a cone-shaped male die 20, and operating a punch press 22 or other press mechanism having a female die 23 against the accumulating body of cones 16. Typically, approximately five cones are added at a time. For the part shown approximately 55 cones are used. The stack of cones is preferably restrained within a cylinder 25.

A partially debulked preform 30 (FIG. 5) thus results that is extremely long and tapered for its thickness. The preform 30 is further debulked by heating it to a sufficient extent to B stage the resin thereof, while subjecting the cones to high pressure. Temperatures of 180° F. and 3000 p.s.i. are preferred for this specific example, in which vitreous silica is employed as the fabric. The pressurization is effected between the dies 20, 23 as shown in FIG. 4. A long substantially conical unitary structure having a density of 98% or more of the desired final density results. The abutment or seam lines 17 are displaced angularly about the body, as seen in FIG. 5.

Figure 6:
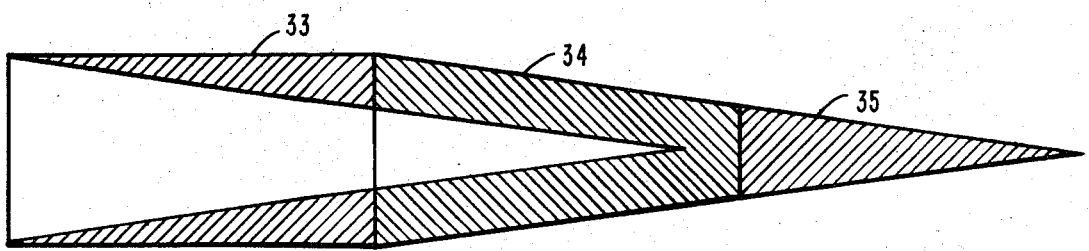
FIG. 6 is a sectional idealized view showing the segmentation of a debulked preform provided from the assembly of FIG. 5.

The preform 30 is then divided transversely at several preselected longitudinal points into separated equal segments 33 and 34 and a plug segment 35, as illustrated in FIG. 6, which can be rearranged into a solid body. The conical narrow tip portions 34, 35 are fitted within the conical hollow interior parts of the matching segments 33, 34 in a reverse or nested fashion. The surfaces of these segments are hand sanded to match, so that the segments 33, 34, 35 fit smoothly and tightly together.

The group of rearranged segments 33, 34, 35 forming the desired body are then placed in a hydroclave 40, as seen in FIG. 7, and subjected to a cycle of increasing temperatures and pressures. In the present practical example, the temperature is increased at the rate of approximately 2° F. per minute, with the pressure being increased during the cycle at approximately 50 p.s.i. per minute. At a temperature of 150° F., a pressure of 50 p.s.i. is reached, in this example, and subsequently 500 p.s.i. is reached at a temperature of 170° F., with a final pressure of 1000 p.s.i. being reached at 180–190°. It is not necessary, however, to reach pressures as high at 1000 p.s.i. for most purposes, inasmuch as all that is required is sufficient unification to prevent delamination during final pressing and curing.

A final curing temperature is reached by bringing the environment to approximately 320° F. and holding the temperature for a time sufficient to fully cure the resin of the material to C stage. Subsequently, the temperature is reduced in a complimentary cooling cycle until room temperature is reached.

It will be noted in FIG. 7 that, with respect to the final hydroclave mechanism disposed in a high temperature oven, the upper and lower surfaces of the cylinder are offset slightly by machinery in order to establish a wedging action during hydroclave cure and to cut down on end grain distortion and subsequent loss of final part length. These material portions may be smoothed off after final curing, by machining, and a central aperture may be drilled into the structure, excising the portions which constitute the very tip of the individual cones 16, so as to provide the cylindrical product shown in FIG. 1.

While there have been described above and illustrated in the drawing various ablative structures and methods of providing ablative structures in accordance with the invention, it will be appreciated that a number of alternatives and modifications are feasible and that the invention should be considered to include all variations and alternative forms.

What is claimed is:
1. The method of assembling a wrinkle and void-free cylindrical part having a longitudinal centerline and layers of resin impregnated fiber reinforced fabric material disposed at an approximately 6° angle relative to the centerline, including the steps of laying up hollow individual cones of curable resin impregnated fiber reinforced ablative fabric, each of the cones having a longitudinal centerline and its sides disposed at a 6° angle relative to the centerline and having a seam line, progressively stacking small numbers of the cones, with the seam lines being angularly displaced from each other to form a cylindrical body having a conical end portion, mechanically debulking the body between a male and female die mechanism under high pressure, until a predetermined length of the debulked body has been assembled, further debulking the body to a density in excess of approximately 98% of the desired final density by pressurizing the body in the male and female die mechanism at approximately 3000 p.s.i. while maintaining a temperature of approximately 180° F. maximum, segmenting the body in a direction normal to the centerline into three segments nestable into a compact solid centered cylindrical form, machining the three segments, rearranging the three segments in nested relation by inserting the smaller segments in mating relation into the matching hollow interior of the larger segments to form the compact solid centered cylindrical form, and finally densifying and curing the compact cylindrical form, by subjecting the form to a cycle of increasing temperatures and pressures adequate to prevent delamination and to fully cure the resin matrix.

2. The invention as set forth in claim 1 above, wherein the temperature is raised at approximately 2° F. per minute and the pressure is raised at 70 p.s.i. per minute, such that a pressure of approximately 50 p.s.i. is reached at a temperature of approximately 150° F., a pressure of approximately 500 p.s.i. is reached at a temperature of 170° F., and a pressure of approximately 1000 p.s.i. is reached at a temperature of approximately 185° F.

3. The method of fabricating a hollow cylindrical ablative part having a plurality of layers of ablative material at a small angle relative to the centerline, including the steps of forming a stack of cones of ablative material, aperturing the central portion of the stack, debulking the stack under temperature and pressure on a male mandrel, segmenting the stack, disposing the segments in nested relation, and finally densifying the part.

4. The method of assembling a cylindrical ablative part having a plurality of layers of ablative material at a small angle relative to the center line of the part which includes the steps of (a) debulking a stack of hollow individual cones of curable resin-impregnated ablative fabric, (b) debulking the stack of cones to form an elongated body at elevated temperatures and pressures to a density in excess of 90% of the desired final density, (c) segmenting the debulked stack of cones, (d) rearranging the segments in nested relation into a compact form, and (e) finally densifying and unifying the rearranged nested segments under elevated temperatures and pressures.

References Cited
UNITED STATES PATENTS

| | | | |
|---|---|---|---|
| 1,475,764 | 11/1923 | Frederick | 264—137 |
| 2,256,701 | 9/1941 | Bacon | 139—153 |
| 2,710,026 | 6/1955 | Stewart | 138—78 |
| 3,215,762 | 11/1965 | Phelps | 264—152 |
| 3,301,742 | 1/1967 | Noland | 161—170 |
| 3,356,781 | 12/1967 | Sulewski | 264—152 |

ROBERT F. WHITE, Primary Examiner

R. R. KUCIA, Assistant Examiner

U.S. Cl. X.R.

156—264; 264—154, 294